US012583594B2

(12) United States Patent
De Britto Costa et al.

(10) Patent No.: US 12,583,594 B2
(45) Date of Patent: Mar. 24, 2026

(54) MULTI-ENGINE ASSEMBLY AND INSTALLATION METHOD FOR ELECTRIC AIRCRAFT PROPULSION

(71) Applicant: Vaeridion GmbH, Munich (DE)

(72) Inventors: Douglas De Britto Costa, Munich (DE); Sebastian Seemann, Niederwerrn (DE); Nando Van Arnhem, Munich (DE)

(73) Assignee: Vaeridion GmbH, Munich (DE)

( * ) Notice: Subject to any disclaimer, the term of this patent is extended or adjusted under 35 U.S.C. 154(b) by 0 days.

(21) Appl. No.: 18/760,211

(22) Filed: Jul. 1, 2024

(65) Prior Publication Data

US 2025/0319974 A1     Oct. 16, 2025

(30) Foreign Application Priority Data

Jun. 7, 2023     (EP) .................................... 23178100

(51) Int. Cl.
| | |
|---|---|
| *B64D 27/30* | (2024.01) |
| *B64D 27/40* | (2024.01) |
| *B64D 35/021* | (2024.01) |
| *B64D 35/08* | (2025.01) |

(52) U.S. Cl.
CPC ........... *B64D 27/30* (2024.01); *B64D 27/402* (2024.01); *B64D 35/021* (2024.01); *B64D 35/08* (2013.01)

(58) Field of Classification Search
CPC ...... B64D 27/30; B64D 27/402; B64D 27/32; B64D 27/34; B64D 35/021; B64D 35/08; B64D 35/024; B64U 50/19
See application file for complete search history.

(56) References Cited

U.S. PATENT DOCUMENTS

| | | | |
|---|---|---|---|
| 2,411,562 | A | 11/1946 | Thompson |
| 2,539,960 | A | 1/1951 | Ivor et al. |
| 4,829,850 | A | 5/1989 | Soloy |

(Continued)

FOREIGN PATENT DOCUMENTS

| | | |
|---|---|---|
| EP | 1535838 A1 | 6/2005 |
| EP | 3757014 A1 | 12/2020 |

(Continued)

OTHER PUBLICATIONS

Extended European Search Report, for European Patent Application No. 23 178 100.6, dated Oct. 26, 2023, 1 pages.

*Primary Examiner* — Rodney A Bonnette
(74) *Attorney, Agent, or Firm* — Westman, Champlin & Koehler, P.A.

(57)     ABSTRACT

The present disclosure relates to a drive device for driving a propeller of an aircraft. The drive device includes a first electric drive motor, a second electric drive motor, and a supporting frame which includes a first mounting section to which the first electric drive motor is mounted, a second mounting section to which the second electric drive motor is mounted, and at least one strut which interconnects the first mounting section and the second mounting section such that the supporting frame provides a cage-like structure. The first electric drive motor and the second electric drive motor are operatively couplable to the propeller. The present disclosure further relates to a supporting frame, an aircraft, and a method for installing a drive device into an aircraft.

19 Claims, 11 Drawing Sheets

(56)     References Cited

U.S. PATENT DOCUMENTS

| | | |
|---|---|---|
| 7,451,947 B2 | 11/2008 | Machado et al. |
| 11,390,395 B2 | 7/2022 | Beall et al. |
| 11,530,033 B2 | 12/2022 | Preisser |
| 2002/0134887 A1 | 9/2002 | Lin et al. |
| 2005/0178888 A1 | 8/2005 | Machado et al. |
| 2017/0174337 A1 | 6/2017 | Roberts et al. |
| 2018/0079533 A1* | 3/2018 | Suchezky .............. B64U 20/87 |
| 2020/0407052 A1 | 12/2020 | Preisser |
| 2021/0276707 A1* | 9/2021 | Heironimus ........... H02K 7/108 |
| 2021/0403174 A1 | 12/2021 | Beall et al. |
| 2022/0274715 A1 | 9/2022 | Beall et al. |
| 2022/0411084 A1 | 12/2022 | Pome et al. |
| 2024/0017843 A1* | 1/2024 | Amargier .............. B64D 27/24 |

FOREIGN PATENT DOCUMENTS

| | | |
|---|---|---|
| EP | 3930158 A1 | 12/2021 |
| EP | 4112476 A1 | 1/2023 |

* cited by examiner

551

MULTI-ENGINE ASSEMBLY AND INSTALLATION METHOD FOR ELECTRIC AIRCRAFT PROPULSION

CROSS-REFERENCES TO RELATED APPLICATION

This application claims priority to European Application No. 23 178 100.6, filed on Jun. 7, 2023, entitled "Multi-engine assembly and installation method for electric aircraft propulsion", the entire content of which is incorporated herein by reference in its entirety.

BACKGROUND

Currently, all certified aircraft for commercial passenger and cargo air transport are powered by conventional combustion-based propulsion systems. Those can be categorized into turbofan engines, primarily for large airplanes, and propeller-mounted turboprop or piston engines. A typical combustion-based powerplant includes a single combustion engine which transmits torque to a propeller or compressor fan stages, referred to as a turbofan. Redundancy on an airplane level is realized through multiple independent engines and typically multiple propellers which are mounted to an airframe of the aircraft at different locations.

Due to relatively strict sustainability goals, which aim to reduce the climate impact of aviation, new energy carriers are being investigated by manufacturers of aircraft and aircraft engines. Aircraft propulsion with electric motors which convert electric power into mechanical power to drive a fan or propeller is promising for passenger and cargo transport.

Small aircraft, normally referred to as "General Aviation airplanes", in a multi-engine configuration of conventional combustion-based turbine engines typically have two separate engines and propellers mounted on each side of the wing. Those systems have several shortfalls, such as One Engine Inoperative (OEI) controllability issues, powerplant/ wing physical and aerodynamic interference, additional weight and cost of an extra propeller, cabin noise due to propeller proximity with passenger cabin, additional weight and drag of an extra nacelle, etc.

Hence, full-electric propulsion systems for aircraft offer new engine architecture opportunities, e.g., which eliminate or reduce one or more of the shortfalls associated with combustion-based propulsion systems with multiple combustion engines.

For in-service commercial airplanes, no combination of multiple combustion engines is normally used on a joint mechanical output, i.e., a common drive shaft. Therefore, any failure within the engine directly leads to the loss of propulsion by the connected propeller. This practice is due to several factors.

First, the design of coupled combustion-based engines is technically challenging and failure prone. The power for the output shaft is generated through a thermodynamic (cyclic) process in cylinders or a combustion chamber. This process usually cannot be accurately controlled in terms of output speed and torque. Variations or differences in the output power of the coupled engines may result in dynamic coupling forces and material stress on the common mechanical components such as shaft or reduction gears.

Second, operation of such coupled combustion-based engines may be associated with significant maintenance, repair, and overhaul, especially for the combined transmission system. Short inspection cycles as well as elaborate material inspection techniques may be required.

Third, there are significant installation challenges for combining more than one internal combustion engine, either piston or jet, to a single propeller output in fixed wing, small aircraft. The main reason is the large physical volume formed by the group of engines, which would have to be installed either in the aircraft nose section, or under wing pylons, resulting on bulky, heavy, and high drag nacelles. In addition, there must be room for dedicated air intakes and exhausts for each engine, which complicate the installation even further, making engine series (in-line) integration unfavorable. Zonal safety aspects must also be accounted for, since the physical proximity between the internal combustion engines increase the risk of a catastrophic failure of one engine affecting the remaining, healthy engine, which makes it difficult to demonstrate engine isolation in the context of civil aircraft certification. In addition to volumetric/physical integration challenges, such complex powerplant architectures also must deal with the significant loads and relative displacements between the propeller and the engines, requiring heavy and complex flexible coupling solutions between critical elements. All these challenges are easier to solve with electric engines, due to their compact, self-contained nature, enabling much simpler installation solutions.

However, one or more aspects related to electric propulsion systems for aircraft have not, or at least not sufficiently, been addressed in the prior art. Thus, there is a need to improve the electric propulsion systems known from the prior art.

SUMMARY

It is therefore an object of the present invention to provide an improved electric propulsion system for an aircraft.

The above-identified object is achieved by a drive device according to a first aspect of the present disclosure, as defined by the features of claim 1. Preferred embodiments are defined by the features of the dependent claims, respectively.

Various exemplary embodiments of the present disclosure disclosed herein are directed to providing features that will become readily apparent by reference to the following description when taken in conjunction with the accompanying drawings. In accordance with various embodiments, exemplary devices are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The drive device is configured for electrically driving one or more propeller(s) or rotor(s) of an aircraft (herein generally referred to as propeller, while this is understood to also cover rotor). The propeller may be the primary or only means of propulsion of the aircraft. The propeller may be attachable, preferably rigidly attachable, to the drive device, e.g., via a flange or other coupling.

Preferably, the drive device is configured for use with a single-propeller aircraft, i.e., single propeller for propelling the aircraft.

The drive device may include a first electric drive motor and at least one second electric drive motor. The drive device may further include a supporting frame which may include a first mounting section to which the first electric drive motor is mounted and at least a second mounting section to which the second electric drive motor is mounted. The supporting frame may further include at least one connecting member, e.g., at least one strut, which interconnects the first mounting section and the second mounting section, preferably such that the supporting frame provides or forms a cage-like structure. The first electric drive motor and the second electric drive motor may be individually mountable to the supporting frame. Individually mountable means that each electric drive motor is mountable to the supporting frame independently from the other electric drive motor(s), i.e., one electric drive motor may be mountable to the supporting frame without mounting the other electric drive motor(s) and/or vice versa. However, the electric drive motors may be mountable to the supporting frame together, i.e., simultaneously or at least partially simultaneously.

The first electric drive motor and the second electric drive motor may be operatively couplable to the propeller such that the first electric drive motor and the second electric drive motor can simultaneously and/or separately drive the propeller.

Configuring the drive device with a plurality of electric drive motors which can simultaneously and/or separately drive the propeller provides a multi-motor or multi-engine system such that, e.g., a propeller can be selectively driven by one or multiple of the motors such that operational flexibility as well as redundancy or even back-up is provided. Providing two electric drive motors, as mentioned above, is only exemplary. The drive device may include more than two electric drive motors and the supporting frame may include more than two mounting sections accordingly for mounting the electric drive motors. The multi-motor or multi-engine system may also allow greater operational versatility. For instance, a single electric drive motor may be used to propel the aircraft in situations in which less power, i.e., the power of only a single electric drive motor, for propelling the aircraft suffices and/or is desired, whereas a plurality of the electric drive motors may be used simultaneously in situations in which more power for propelling the aircraft is required and/or desired, e.g., during takeoff. Moreover, this may allow the size and/or maximum available power of at least one, preferably each, of the electric drive motors to be reduced, which may, e.g., facilitate installation of the electric drive motors and/or reduce costs.

The drive device may be configured such that one or more operational modes of the drive device, i.e., whether the electric drive motors are simultaneously and/or separately driving the propeller and/or in which a ratio of power of the electric drive motors is adjustable, may be automatically controllable, e.g., by means of at least one control device, and/or manually controllable, e.g., by means of at least one input device which may be arranged in a cockpit of the aircraft.

The electric drive motors may be of any type and/or design. For instance, the electric drive motors may be configured as radial flux motors or axial flux motors.

Configuring the supporting frame as a cage-like structure via the assembled mounting sections and interconnecting connecting member, e.g., a strut, provides an open-framed support structure, i.e., in a lattice-like manner, for supporting the electric drive motors, and optionally one or more further components. This may provide an increased rigidity and/or an improved load transfer, e.g., a single load path, and/or an improved load distribution by the supporting frame. Moreover, this may facilitate ventilation through and/or within the supporting frame, e.g., to facilitate cooling of one or more components, e.g., the electric drive motors. Moreover, the cage-like structure of the supporting frame may facilitate inspection of the drive device and/or further components of the aircraft and/or may facilitate assembly, disassembly, installation and/or removal of the drive device, more specifically of the supporting frame and/or the electric drive motors.

The supporting frame may allow one or more loads, e.g., one or more loads originating from the electric drive motors and/or the propeller, to be collected and transmitted to an airframe of the aircraft, while reducing, or even eliminating, cross-transmission of these loads between the electric drive motors and between one or more of the electric drive motors and the propeller. Therefore, the supporting frame may bear the loads and torque of all engines and may route the resulting loads into the airframe, for example through shock mounts and/or additional struts. Thus, the drive device may rely on the supporting frame for providing structural support and rigidity, while reducing or eliminating stress on further components, such as the electric drive motors Moreover, the supporting frame may contribute to the independence of each electric drive motor, which may facilitate and/or allow multi-engine certifiability of the drive device described herein. In this context, the supporting frame may serve as a common mounting structure for, preferably modularly, adding one or more further components configured to increase a separation of the electric drive motors from each other. For instance, the drive device may include one or more separating elements, e.g., one or more covers, arranged at one or more positions of the supporting frame to at least partially separate and/or isolate the first electric drive motor from the second electric drive motor and/or vice versa. The one or more separating elements may contribute to the independence and/or isolation of each electric drive motor, e.g., by providing zonal segregation. Such zonal segregation can include barriers or shields, depending on the nature of, e.g., electric machine hazards, to be isolated. Zonal segregation can also provide fire zoning.

The drive device may further include at least one decoupling device configured to at least partially operatively decouple the first electric drive motor and/or the second electric drive motor from the propeller. Preferably, the decoupling device is configured as a clutch, preferably an overrunning clutch. Preferably, a decoupling device is provided for and associated with each electric drive motor. In other words, a decoupling device may be provided for the first electric drive motor and a further decoupling device may be provided for the second electric drive motor. The decoupling device may be at least partially arranged between a rotating part of the respective electric drive motor and a driveshaft which transmits power from the respective electric drive motor to the propeller.

Preferably, the decoupling device is configured to be actuated actively and/or passively. The term "actuate" may mean to cause coupling and/or decoupling of the respective electric drive motor(s). In other words, the decoupling device may be configured to be actively actuated, e.g., by means of at least one input device, which may be arranged in a cockpit of the aircraft. Alternatively, or additionally, the decoupling device may be configured to be actuated passively or automatically, i.e., without manual/human input.

Preferably, the decoupling device is arranged:

between the first electric drive motor and the propeller; and/or between the second electric drive motor and the propeller.

"Arranged between" may mean that the decoupling device is physically arranged between the respective electric drive motor and the propeller and/or that the decoupling device is arranged in a path of power transmission between the respective electric drive motor and the propeller, i.e., to interrupt the path of power transmission.

Preferably, the drive device further includes at least one pitch adjusting mechanism configured to adjust a pitch of blades of the propeller. The pitch adjusting mechanism may be configured to adjust the pitch of the blade(s) of the propeller automatically, e.g., by means of at least one controller, e.g., based on one or more physical parameters, such as on the speed or rotation frequency (in rpm) of the propeller, e.g., to maintain a constant speed or rotation frequency of the propeller, and/or manually, e.g., by means of at least one input device which may be arranged in a cockpit of the aircraft.

The pitch adjusting mechanism may be arranged within a hub of the propeller. The drive device may include a propeller support unit which provides one or more auxiliary functions to the pitch adjusting mechanism. The one or more auxiliary functions may include, but are not limited to, mounting and driving provisions for a suitable Propeller Governor Unit (PGU) which meters oil pressure to the propeller hub as required to maintain a particular blade pitch, which will ensure the crew commanded propeller speed is maintained regardless of input torque or aircraft airspeed. Other types of governors, pumps, sensors, or accessories may also be provided, as required by and/or desired for the detailed system architecture. The PSU, which provides mounting and driving provisions for the PGU, may house and/or manage its own oil system. The oil system may be completely segregated from the electric drive motors and/or the decoupling devices.

Preferably, the supporting frame is configured as a single coherent unit to which the first electric drive motor and second electric drive motor may be individually mountable. Thus, the supporting frame may be assembled to a single coherent unit before being installed into the aircraft such that the supporting frame may be maneuvered as a single unit with or without motors attached thereto. Preferably, the electric drive motors and the supporting frame may be assemblable to provide a single coherent unit, e.g., such that the resulting assembly may be maneuvered as a single coherent unit, in particular before being installed into the aircraft. For instance, prior to installation, the first electric drive motor and/or the second electric drive motor may be mounted to the supporting frame, and the connecting member(s), e.g., the strut(s), may be connected, preferably removably connected, to the first mounting section and/or the second mounting section. In this assembled state, the supporting frame including the electric drive motors may be mounted to an airframe of the aircraft. Optionally, the assembly may be delivered to a customer and/or moved around in a warehouse prior to installation. Also, removing and/or installing each engine individually, while the drive device is already installed on the aircraft ("on wing") is advantageously facilitated. This may improve ease of maintenance and repair.

As an alternative to assembling the supporting frame prior to installation, the supporting frame may be formed monolithically and/or integrally, i.e., during manufacturing of the supporting frame.

It may be recognized that the attachment points of the drive device may allowing for retrofitting, e.g., by having parallels to existing turboprop aircraft, to an existing aircraft which is configured to include or has included at least one combustion engine for driving the propeller of the aircraft. In other words, the drive device may replace the combustion engine for driving the (formerly combustion engine based) aircraft.

Preferably, the first electric drive motor includes a first electric drive motor housing, and the second electric drive motor includes a second electric drive motor housing. Preferably, the first mounting section and the second mounting section are distanced from each other such that the first electric drive motor housing and the second electric drive motor housing are spaced from each other, when the first electric drive motor and the second electric drive motor are mounted to the first mounting section and the second mounting section, respectively. This may reduce one or more cross-influences, e.g., mechanical and/or thermal cross-influences, between the electric drive motors, e.g., when one of the electric drive motors fails and/or when at least one of the electric drive motors heats up. This may reduce or prevent potential carryover of adverse effects from the malfunctioning and/or overheating electric drive motor(s) to the other electric drive motor(s). Preferably, the electric drive motor housing and the second electric drive motor housing are free of contact to each other, when the first electric drive motor and the second electric drive motor are mounted to the first mounting section and the second mounting section, respectively. Preferably, there is at least one gap between the electric drive motor housing and the second electric drive motor housing, when the first electric drive motor and the second electric drive motor are mounted to the first mounting section and the second mounting section, respectively.

Preferably, one or more of the electric drive motors are arranged within the cage-like structure of the supporting frame, when the first electric drive motor and the second electric drive motor are mounted to the first mounting section and the second mounting section, respectively.

Preferably, the supporting frame includes a proximal end arranged towards or at the propeller and a distal end arranged away from the propeller. The first mounting section and/or the second mounting section may be arranged at the distal end. Preferably, the first mounting section and/or the second mounting section is/are configured such that the first electric drive motor and/or the second electric drive motor extend(s) from the respective mounting section in a direction away from the propeller, when the first electric drive motor and the second electric drive motor are mounted to the supporting frame, respectively. The electric drive motor(s) mounted at the distal end of the supporting frame may be arranged outside of the cage-like structure of the supporting frame, when the first electric drive motor and the second electric drive motor are mounted to the first mounting section and the second mounting section, respectively. This may reduce the size and/or weight of the supporting frame, in particular by utilizing the distal end of the supporting frame to mount one of the electric drive motors.

Preferably, at least one of the electric drive motors is arranged within the cage-like structure of the supporting frame and at least one of the other electric drive motor(s), i.e., the electric drive motor(s) mounted at the distal end of the supporting frame, may be arranged outside of the cage-like structure of the supporting frame, when the first electric drive motor and the second electric drive motor are mounted to the first mounting section and the second mounting section, respectively.

Preferably, the drive device further includes a drive shaft configured to operatively couple the first electric drive motor and the second electric drive motor to the propeller. Preferably, the drive shaft is formed as a single piece. In other words, the drive shaft may be a common drive shaft to both or all of the electric drive motors. The drive shaft may be assembled to a single piece, i.e., a single coherent unit, preferably prior to installing the drive shaft in the drive device. Alternatively, the drive shaft may be formed monolithically and/or integrally, i.e., during manufacturing of the drive shaft.

Preferably, the first electric drive motor and the second electric drive motor each include an output shaft configured to be operatively couplable to the drive shaft. Preferably, the output shaft of the first electric drive motor and/or the output shaft of the second electric drive motor is/are hollow. Preferably, the drive shaft extends at least partly or completely through the hollow output shaft(s).

Alternatively, wherein the rotating part of the first and/or second electric drive motor, i.e., the rotor, is directly mounted to the drive shaft via a decoupling device.

Preferably, the output shaft of the first electric drive motor and the output shaft of the second electric drive motor, and optionally also the drive shaft, are arranged coaxially, when the first electric drive motor and the second electric drive motor are mounted to the supporting frame.

Preferably, the first electric drive motor and the second electric drive motor are arranged in series, preferably in a direction along the drive shaft.

Preferably, the first mounting section and/or the second mounting section is/are each configured as an annular or semi-annular shaped plate. The language "annular or semi-annular shaped", within the meaning of the present disclosure, refers to a structure which extends circumferentially with at least one open space at least in the center thereof. The "annular or semi-annular shaped plate" may have a circular inner circumference and/or a circular outer circumference but is not limited to such. Instead, the inner circumference and/or the outer circumference of the "annular or semi-annular shaped plate" may have any shape, e.g., the "annular or semi-annular shaped plate" may have a polygonal-shaped inner circumference and/or a polygonal-shaped outer circumference.

Preferably, the supporting frame includes a plurality of the at least one strut. Preferably, the plurality of struts is arranged further radially on the supporting frame, with respect to a longitudinal axis of the supporting frame, than the first electric drive motor and the second electric drive motor, when the first electric drive motor and the second electric drive motor are mounted to the supporting frame. This may provide structural integrity and connection between each mounting plate, particularly such that all elements continue to be concentric, coaxial, and axially separated under specified loads. Needless to say, such concentricity may allow for functionally negligible deformation of the whole mounting frame. This may also provide protection to the first electric drive motor and the second electric drive motor, e.g., against compressions forces which may act on the supporting frame.

Preferably, the supporting frame is configured to at least partially, preferably completely, encompass the first electric drive motor and/or the second electric drive motor, when the first electric drive motor and the second electric drive motor are mounted to the supporting frame, respectively.

Preferably, the supporting frame further includes at least one propeller system mounting section to which the propeller is mountable and at least one aircraft mount configured to attach the supporting frame to the aircraft. Preferably, the aircraft mount, preferably each aircraft mount, is arranged between the propeller system mounting section and the first mounting section and the second mounting section. Preferably, the aircraft mount connects the propeller system mounting section with the first mounting section and/or the second mounting section.

Preferably, the supporting frame further includes a plurality of the at least one aircraft mount. Preferably, the plurality of aircraft mounts connect the propeller system mounting section with the frame. This particularly results in the frame being a central element connecting all components, such as propeller, gearbox, and/or engine(s) allows each component not to share loads in between them. Preferably, there are no other components which connect the frame to the aircraft's airframe.

Preferably, the aircraft mounts are arranged diametrically with respect to a longitudinal axis of the supporting frame.

Preferably, the first mounting section and/or the second mounting section is/are configured such that the first electric drive motor and/or the second electric drive motor extend(s) away from the propeller, when the first electric drive motor and the second electric drive motor are mounted to the first mounting section and the second mounting section, respectively, and the drive device is mounted to the aircraft.

Preferably, the connecting member(s), e.g., the strut(s), is/are removably connected to the first mounting section and/or the second mounting section. "Removably connected", within the context of the present disclosure, means that the connecting member(s), e.g., the strut(s), may be disconnected from the first mounting section and/or the second mounting section, respectively, without compromising the structural integrity of the supporting frame, particularly without invasive methods which could affect or modify the supporting frame (such as cutting). For instance, the connecting member(s), e.g., the strut(s), may be connected to the first mounting section and/or the second mounting section via one or more releasable connectors, e.g., bolts, clips, etc.

The object mentioned at the beginning is also solved by a supporting frame to which a first electric drive motor and at least one second electric drive motor are individually mountable. The supporting frame may include a first mounting section to which the first electric drive motor is mountable and at least a second mounting section to which the second electric drive motor is mountable, and at least one strut which interconnects the first mounting section and the second mounting section, preferably to provide or form a cage-like structure. Preferably, the supporting frame is mountable to an aircraft to electrically drive a propeller of the aircraft via the first electric drive motor and the second electric drive motor. The features, embodiments, and advantages described above with respect to the drive device apply to the supporting frame accordingly.

The object mentioned at the beginning is also solved by an aircraft including the drive device according to any of the embodiments described herein and at least one propeller which is operatively couplable to the first electric drive motor and the second electric drive motor of the drive device. The features, embodiments, and advantages described above with respect to the drive device apply to the aircraft accordingly.

Preferably, the aircraft is configured as a single-propeller or single-rotor aircraft.

Optionally, the drive device is retrofitted to the aircraft by replacing at least one combustion engine for driving the propeller by the drive device.

The object mentioned at the beginning is also solved by a method for installing a drive device, preferably the drive device according to any of the embodiments described herein, for electrically driving a propeller of an aircraft into the aircraft. The features, embodiments, and advantages described above with respect to the drive device apply to the method accordingly.

The method may include:

(a) mounting a first electric drive motor to a first mounting section of a supporting frame.

The method may include:

(b) mounting at least one second electric drive motor to a second mounting section of the supporting frame.

The method may include:

(c) connecting at least one strut to the first mounting section and/or the second mounting section to interconnect the first mounting section and the second mounting section.

The method may include:

(d) mounting the assembled drive device to an airframe of the aircraft.

Preferably, steps (a) and (b) are performed sequentially and/or separately.

Preferably, step (c) is performed after step (a) and/or after step (b).

Preferably, in step (c), the strut is removably connected to the first mounting section and/or the second mounting section.

Preferably, step (d) is performed after steps (a), (b), and (c). Further preferably, step (c) is performed after step (a) and/or after step (b), preferably wherein step (c) is performed after step (a) and before step (b). Furthermore preferably, steps (a) and (b) are performed after steps (c) and (d).

The following list of aspects provides alternative and/or further features of the invention:

1. A drive device for electrically driving a propeller of an aircraft, the drive device including:
   a first electric drive motor;
   at least one second electric drive motor; and
   at least one supporting frame which includes a first mounting section to which the first electric drive motor is mounted, at least a second mounting section to which the second electric drive motor is mounted, and at least one connecting member, preferably at least one strut, which interconnects the first mounting section and the second mounting section, preferably such that the supporting frame provides a cage-like structure, preferably wherein the first electric drive motor and the second electric drive motor are individually mountable to the supporting frame;
   wherein the first electric drive motor and the second electric drive motor are operatively couplable to the propeller such that the first electric drive motor and the second electric drive motor can simultaneously and/or separately drive the propeller.

2. The drive device according to aspect 1, further including at least one decoupling device configured to at least partially operatively decouple the first electric drive motor and/or the second electric drive motor from the propeller, preferably wherein the decoupling device is configured as a clutch, preferably an overrunning clutch.

3. The drive device according to aspect 2, wherein the decoupling device is configured to be actuated actively and/or passively.

4. The drive device according to aspect 2 or 3, wherein the decoupling device is arranged:
   between the first electric drive motor and the propeller; and/or
   between the second electric drive motor and the propeller.

5. The drive device according to any of the preceding aspects, further including at least one pitch adjusting mechanism configured to adjust a pitch of the blade of the propeller.

6. The drive device according to any of the preceding aspects, wherein the supporting frame is configured as a single coherent unit to which the first electric drive motor and second electric drive motor are individually mountable.

7. The drive device according to any of the preceding aspects, wherein the drive device is configured to be retrofitted to an existing aircraft which is configured to include or has included at least one combustion engine for driving the propeller of the aircraft.

8. The drive device according to any of the preceding aspects, wherein the first electric drive motor includes a first electric drive motor housing and the second electric drive motor includes a second electric drive motor housing, wherein first mounting section and the second mounting section are distanced from each other such that the first electric drive motor housing and the second electric drive motor housing are spaced from each other, when the first electric drive motor and the second electric drive motor are mounted to the first mounting section and the second mounting section, respectively.

9. The drive device according to any of the preceding aspects, wherein the supporting frame includes a proximal end arranged towards or at the propeller and a distal end arranged away from the propeller, wherein the first mounting section and/or the second mounting section is/are arranged at the distal end, preferably wherein the first mounting section and/or the second mounting section is/are configured such that the first electric drive motor and/or the second electric drive motor extend(s) from the respective mounting section in a direction away from the propeller, when the first electric drive motor and the second electric drive motor are mounted to the supporting frame, respectively.

10. The drive device according to any of the preceding aspects, further including a drive shaft configured to operatively couple the first electric drive motor and the second electric drive motor to the propeller, wherein the drive shaft is formed as a single piece.

11. The drive device according to aspect 10, wherein the first electric drive motor and the second electric drive motor each include an output shaft configured to be operatively couplable to the drive shaft, preferably wherein the output shaft of the first electric drive motor and/or the output shaft of the second electric drive motor is/are hollow, preferably wherein the drive shaft extends at least partly through each of the hollow output shaft(s).

12. The drive device according to aspect 10, wherein the rotating part of the motor is directly mounted to the drive shaft via a decoupling device.

13. The drive device according to aspect 11, wherein the output shaft of the first electric drive motor and the output shaft of the second electric drive motor, and optionally also the drive shaft, are arranged coaxially, when the first electric drive motor and the second electric drive motor are mounted to the supporting frame.

14. The drive device according to any of aspects 10 to 13, wherein the first electric drive motor and the second electric drive motor are arranged in series in a direction along the drive shaft.

15. The drive device according to any of the preceding aspects, wherein the first mounting section and/or the second mounting section is/are each configured as an annular or semi-annular shaped plate.

16. The drive device according to any of the preceding aspects, including a plurality of the at least one connecting member, preferably a plurality of the at least one strut, preferably wherein the plurality of connecting members, preferably the plurality of struts, are arranged further radially on the supporting frame, with respect to a longitudinal axis of the supporting frame, than the first electric drive motor and the second electric drive motor, when the first electric drive motor and the second electric drive motor are mounted to the supporting frame.

17. The drive device according to aspect 16, wherein the supporting frame is configured to at least partially, preferably completely, encompass the first electric drive motor and/or the second electric drive motor, when the first electric drive motor and the second electric drive motor are mounted to the supporting frame, respectively.

18. The drive device according to any of the preceding aspects, wherein the supporting frame further includes at least one propeller system mounting section to which the propeller is mountable and at least one aircraft mount configured to attach the supporting frame to the aircraft, wherein the aircraft mount, preferably each aircraft mount, is arranged between the propeller system mounting section and the first mounting section and the second mounting section.

19. The drive device according to aspect 17, wherein the supporting frame further includes a plurality of the at least one aircraft mount, wherein the plurality of aircraft mounts connect the propeller system mounting section with the first mounting section and/or the second mounting section.

20. The drive device according to aspect 19, wherein the aircraft mounts are arranged diametrically with respect to a longitudinal axis of the supporting frame.

21. The drive device according to any one of aspects 18 to 20, wherein the aircraft mounts, which are an integral part of the supporting frame, provide mounting base for removably attaching shock mounts for attaching to the aircraft's airframe.

22. The drive device according to any of the preceding aspects, wherein the first mounting section and/or the second mounting section is/are configured such that the first electric drive motor and/or the second electric drive motor extend(s) from the respective mounting section in a direction away from the propeller, when the first electric drive motor and the second electric drive motor are mounted to the first mounting section and the second mounting section, respectively, and the drive device is mounted to the aircraft.

23. The drive device according to any of the preceding aspects, wherein the drive device is configured for use with a single-propeller and/or, wherein the drive device is configured for use with a single-propeller in an aircraft having two or more propellers.

24. The drive device according to any of the preceding aspects, wherein the connecting member(s), preferably the strut(s), is/are removably connected to the first mounting section and/or the second mounting section.

25. A supporting frame to which a first electric drive motor and at least one second electric drive motor are individually mountable, wherein the supporting frame includes a first mounting section to which the first electric drive motor is mountable, at least a second mounting section to which the second electric drive motor is mountable, and at least one connecting member, preferably at least one strut, which interconnects the first mounting section and the second mounting section, preferably such that the supporting frame provides a cage-like structure, wherein the supporting frame is mountable to an aircraft to electrically drive a propeller of the aircraft via the first electric drive motor and/or the second electric drive motor.

26. An aircraft including the drive device according to any of aspects 1 to 23 and at least one propeller which is operatively couplable to the first electric drive motor and the second electric drive motor of the drive device.

27. The aircraft according to aspect 26, wherein the aircraft is configured as a single-propeller or single-rotor aircraft.

28. The aircraft according to aspect 26 or 27, wherein the drive device is retrofitted to the aircraft by replacing at least one combustion engine for driving the propeller by the drive device.

29. A method for installing a drive device, preferably the drive device according to any of aspects 1 to 24, for electrically driving a propeller of an aircraft into the aircraft, the method including:
(a) mounting a first electric drive motor to a first mounting section of a supporting frame;
(b) mounting at least one second electric drive motor to a second mounting section of the supporting frame;
(c) connecting at least one connecting member, preferably at least one strut, to the first mounting section and/or the second mounting section to interconnect the first mounting section and the second mounting section; and
(d) mounting the assembled drive device to an airframe of the aircraft.

30. The method according to aspect 29, wherein steps (a) and (b) are performed sequentially and/or separately.

31. The method according to aspect 29 or 30, wherein step (c) is performed after step (a) and/or after step (b), preferably wherein step (c) is performed after step (a) and before step (b), or wherein steps (a) and (b) are performed after steps (c) and (d).

32. The method according to any of aspects 29 to 31, wherein, in step (c), the strut is removably connected to the first mounting section and/or the second mounting section.

Embodiments of the present invention are further elucidated below with reference to the figures. The figures are schematic drawings and as such may not show all details of the systems and their components. Particularly, the drawings are not necessarily to scale, and the shown dimensions are only exemplary and may vary. The drawings illustrate exemplary embodiments to provide a thorough understanding of the present invention. The drawings are not intended to limit the scope of the invention, which is defined by the appended claims and is to include the equivalents thereof.

BRIEF DESCRIPTION OF THE FIGURES

FIG. 6 FIGS. 6A and 6B show, in a schematic perspective view, variants of supporting frames of the electric propulsion unit of FIGS. 2 to 5;

FIG. 7 FIGS. 7A and 7B show, FIG. 7A in a schematic perspective view and FIG. 7B in a cross-sectional side view, further embodiments of the electric propulsion unit of the powerplant of FIGS. 2 to 5;

DETAILED DESCRIPTION OF PREFERRED EMBODIMENTS

Figure 1:
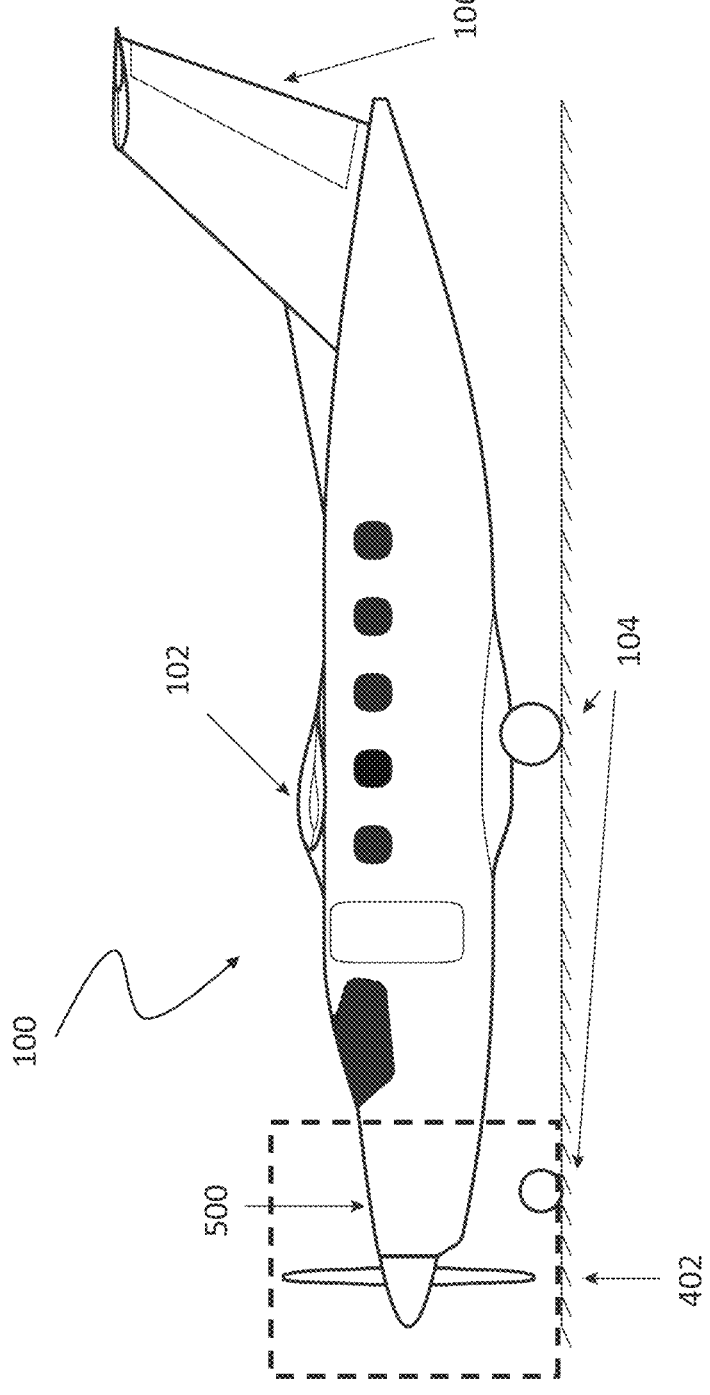
FIG. 1 shows, in a schematic side view, an aircraft according to an embodiment of the present invention.

FIG. 1 shows an exemplary electric conventional take-off and landing (eCTOL) aircraft 100 which is powered by a multi-engine electric propulsion unit 500 which drives a single propeller 402 installed at the aircraft nose. The aircraft is provided with high wings 102, having battery modules integrated therein and a retractable landing gear 104. The exemplary aircraft further has a conventional T-tail 106 with mechanical control links.

It should be noted that the aircraft 100 is of exemplary nature and that other aircrafts or aircrafts with other features may be used along with the present disclosure.

Figure 2:
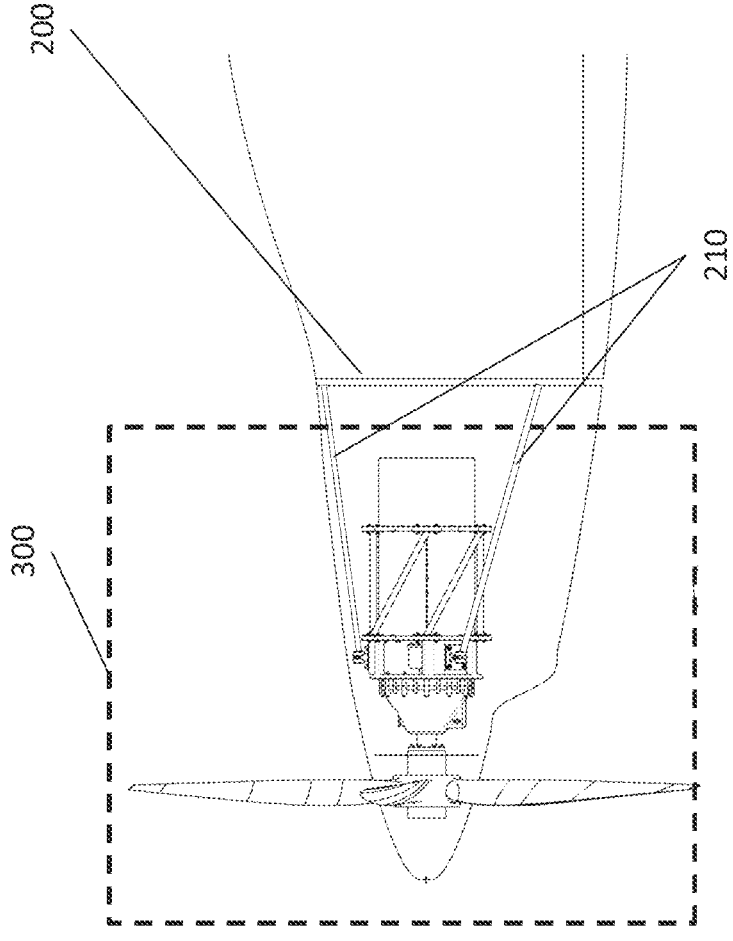
FIG. 2 shows, in a schematic side view, a powerplant which is installed within a nose section of the aircraft of FIG. 1.

FIG. 2 shows a powerplant 300 which is installed within an aircraft nose section of the aircraft 100 by means of conventional tubular mounting struts 210 to an airframe of the aircraft 100, e.g., via a load carrying bulkhead 200 which may also segregate a powerplant compartment from a cockpit interior.

Figures 3, 4:
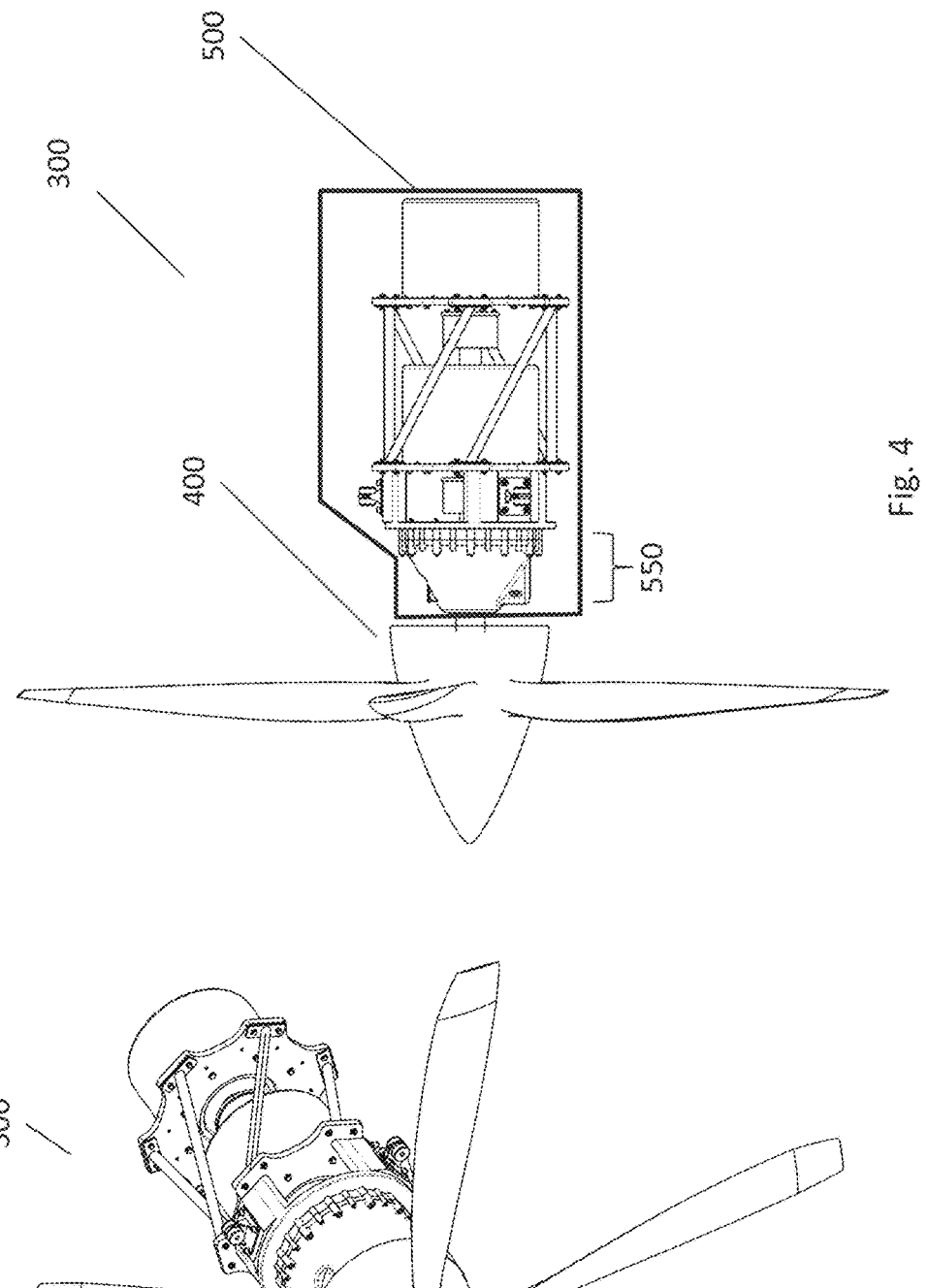
FIG. 3 shows, in a schematic perspective view, the powerplant of FIG. 2.
FIG. 4 shows, in a schematic side view, the powerplant of FIG. 2.

As shown in FIGS. 3 and 4, the powerplant 300 includes a propeller system 400 and an electric propulsion unit (EPU) 500 which provides torque to the propeller. The powerplant 300 has the main function of producing thrust force to propel the aircraft, e.g., as commanded by the pilot(s).

The propeller system may be a conventional system normally employed in general aviation fixed-wing aircraft applications. The propeller system may include a main rotating assembly which includes a center hub assembly and propeller blades, and optionally any required control units (e.g., propeller governor unit, overspeed governor, unfeathering pump, etc.).

As shown in FIG. 4, the propeller system 400 may include a variable pitch propeller system, most commonly, of the constant-speed type. Alternatively (not shown) a fixed-pitch propeller system may be provided, which is of simpler nature and does not require a pitch control system, i.e., can be mounted directly at an output shaft of the EPU, without governing units and oil system supply. The constant-speed propeller system requires an interface functional support unit, herein defined as propeller support unit (PSU) 550, which provides the main propeller assembly with speed control means, i.e., governing units and oil system supply.

Figure 5:
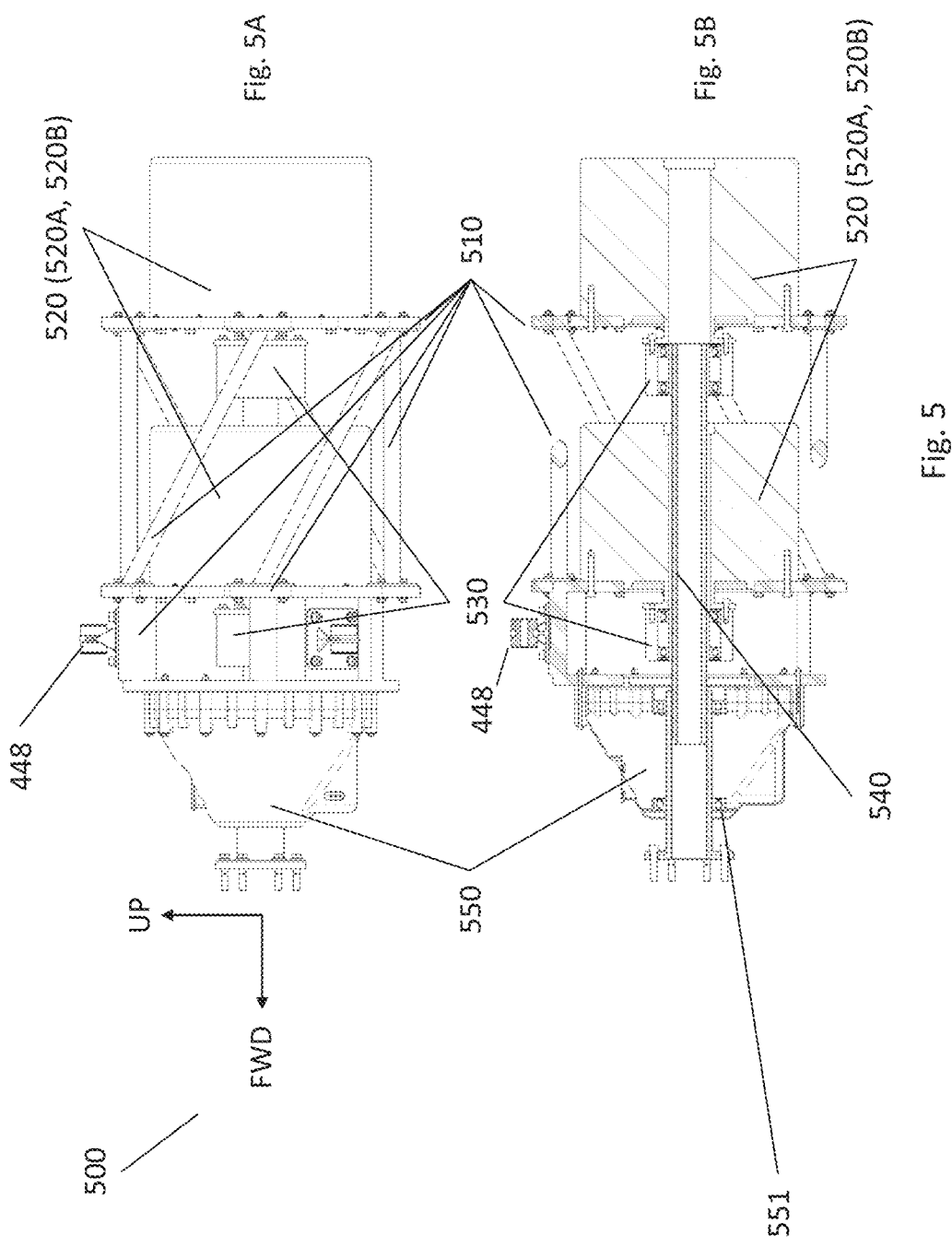
FIG. 5 shows, in a schematic perspective view, an electric propulsion unit of the powerplant of FIGS. 2 to 4.

As shown in FIG. 5, the EPU 500 may include a plurality of electric drive motors 520. FIG. 5A shows an exemplary side view while FIG. 5B shows a cross-sectional view. As shown in exemplary manner, the EPU 500 may include a first electric drive motor 520A (left in the figures) and at least one second electric drive motor 520B (right in the figures). However, the EPU 500 may have more than two electric drive motors 520.

As also shown in FIG. 6, the EPU 500 may further include a supporting frame 510, which may also be referred to as a cage or as having a cage structure, which may include a first mounting section 512 to which the first electric drive motor 520A is mounted and at least a second mounting section 513 to which the second electric drive motor 520B is mounted. The first mounting section 512 and/or the second mounting section 513 are preferably ring shaped.

The electric drive motors 520 are preferably rigidly attached to the supporting frame 510. Part of the supporting frame 510 may be referred to as a torque box section 518, which includes the mounting sections 512, 513 and connecting members 516, discussed below, connecting the first and second mounting sections 512, 513. The torque box section 518 may be seen as the structural part of the supporting frame 510 that connects the first and second motor to an airframe mounting section 522. The airframe mounting section 522 may be seen as the structural part of the supporting frame 510 to which the propeller system 400 is attached via a propeller system mounting system section 511 and which provides an aircraft mounting base 515, e.g., for removably attaching shock mounts 448 for attaching to the aircraft's airframe. Preferably, the torque box section 518 is provided on one side of the airframe mounting section 522, the propeller system mounting system section 511 being provided at the opposite side of the airframe mounting section 522. While the propeller system mounting system section 511 and the torque box section 518 are arranged at axially opposite sides of the airframe mounting section 522, the aircraft mounting base 515 is preferably provided at radial positions about the airframe mounting section 522. When referring to an axial direction, this may generally refer to the axis of the propeller drive shaft. The aircraft mounting base 515 may provide mounting provisions for releasable attachment of the shock mounts 448.

The supporting frame 510 may further include at least one connecting member 516, e.g., at least one strut, preferably a plurality of connecting members 516, which interconnects the first mounting section 512 and the second mounting section 513 such that the supporting frame 510 provides or forms a cage-like structure. In other words, the mounting sections 512, 513 are rigidly connected to each other in a series arrangement by the connecting member(s) 516. The connecting member(s) 516 are preferably configured to withstand all interface loads imposed by the electric drive motors 520 and/or the propeller 402, while maintaining acceptable alignment and/or concentricity of the mounting sections 512, 513.

Figure 6A:
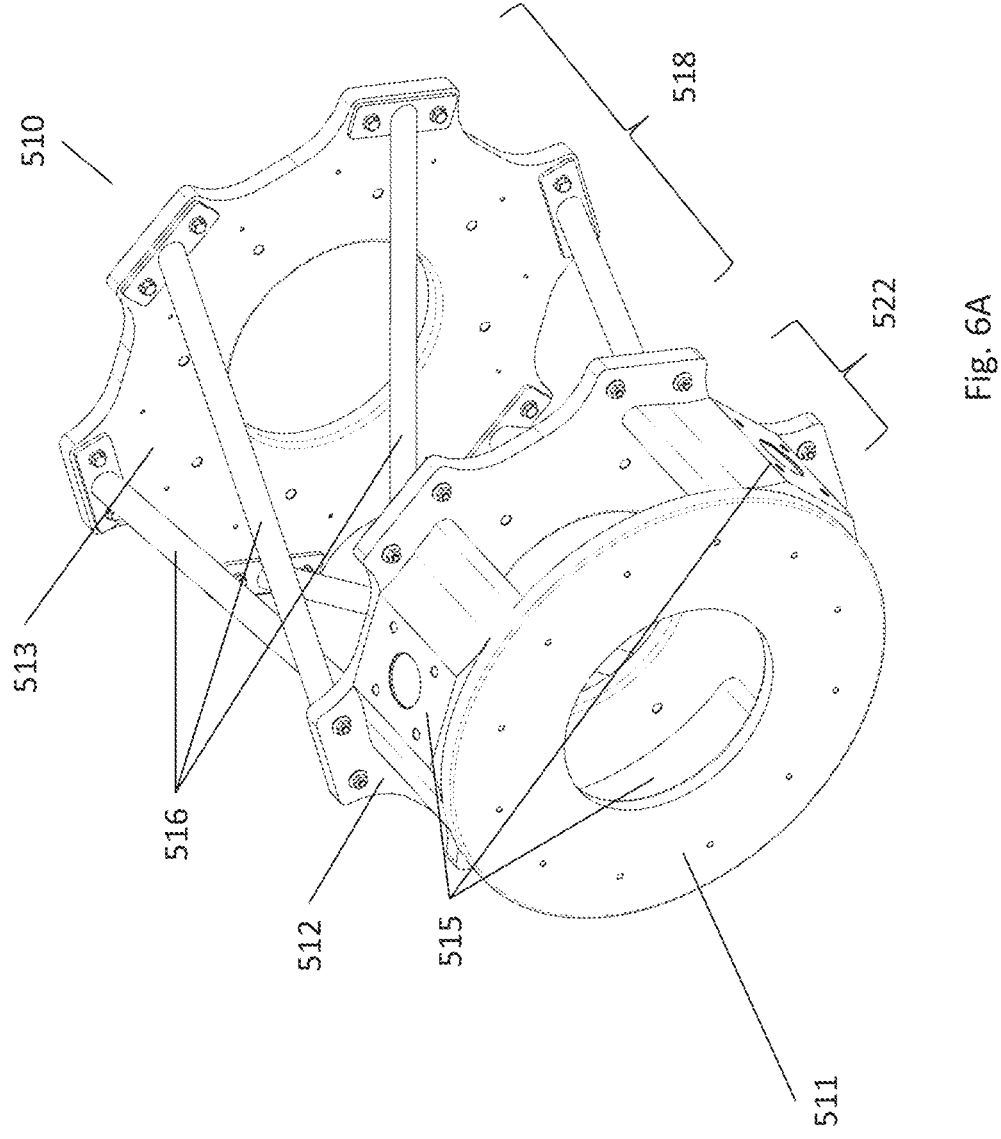
Figure 6B:
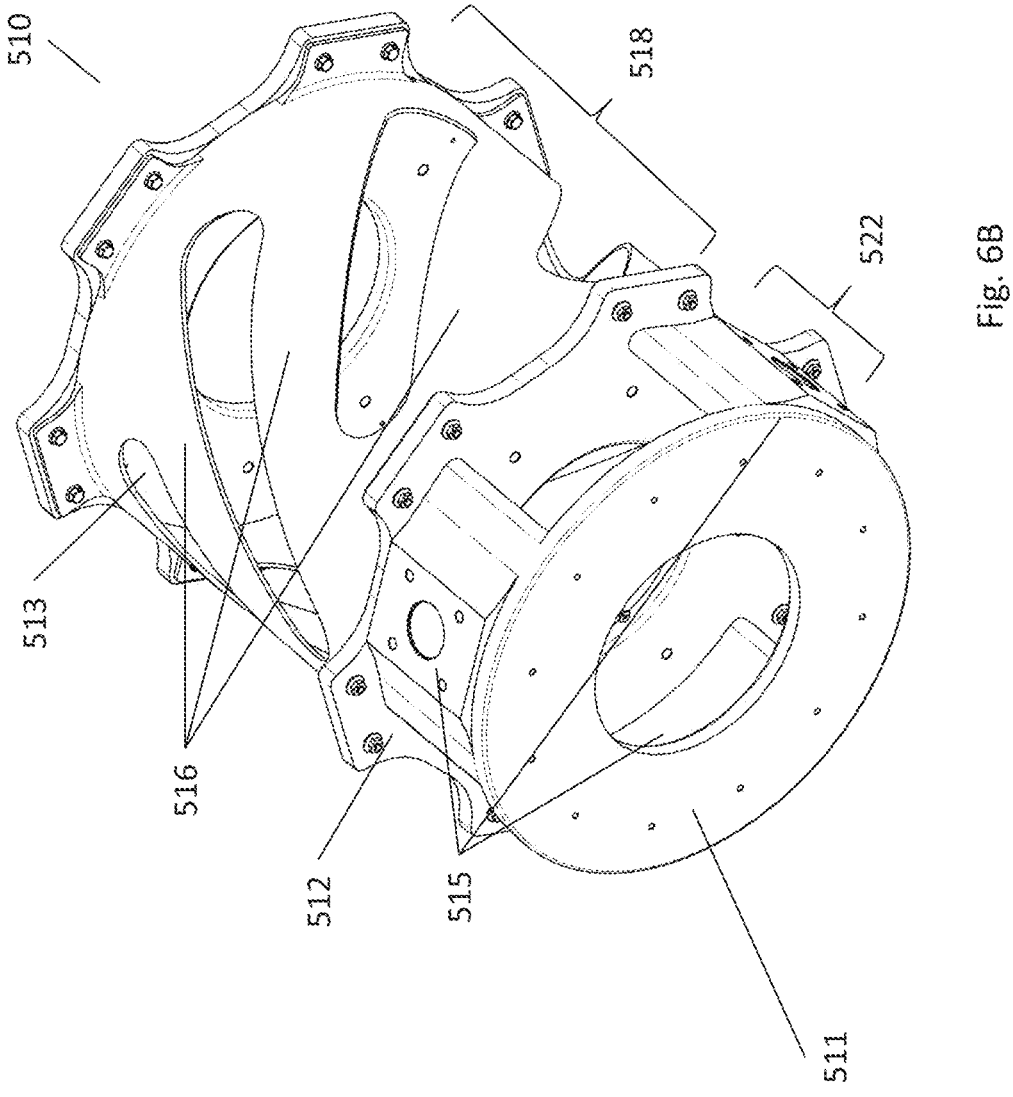

As can be taken from FIG. 6A, a connecting member 516 may take the general shape of a rod. Multiple connecting members 516 individually extend between the first and second mount sections 512, 513. Alternatively, multiple connecting members 516 may be connected or integrally formed. A connecting member 516 may have round, oval, square, rectangular, flat, or sheet like cross section. It may axially extend between the first and second mount sections 512, 513 or exhibit a spiral, helical or wound configuration. As can be taken from FIG. 6B, the connecting members 516 may be integrally formed and form a cylindrical structure. The cylindrical structure may form as a cylindrical connecting member with slits.

The first electric drive motor 520A and the second electric drive motor 520B may be individually mountable to the supporting frame 510. Preferably, the first mounting section 512 and/or the second mounting section 513 is/are each configured as an annular or semi-annular shaped plate.

Thus, the supporting frame 510 may provide a common connecting structure for the electric drive motors 520. Thus, the EPU 500, including the electric drive motors 520 mounted to the supporting frame 510, is designed to behave as a single structural unit in structural terms, transferring loads between the propeller 402 and an airframe of the aircraft 100.

The EPU 500 allows each electric drive motor 520 to be provided with completely independent electrical power and control sources, including independent monitoring.

Each electric drive motor 520 is a completely independent mechanical power generation unit, which can be independently controlled by, e.g., manually by the crew, as any conventional multi-engine aircraft, by dedicated and segregated power control levers, main power switches, etc. When operating in torque mode, each electric drive motor 520 will only add its commanded target torque contribution to a drive shaft (see below for more details), being it equal or different among all electric drive motors 520, as desired.

The first electric drive motor 520A and the second electric drive motor 520B may be operatively couplable to the propeller 402 such that the first electric drive motor 520A and the second electric drive motor 520B can simultaneously and/or separately drive the propeller 402.

Each electric drive motor 520 may include (but not limited to) one or more of the following components: a standalone electric motor (stator+rotor), one or more sets of windings, and one or more inverter units, preferably one or more externally mounted inverter units. Each electric drive motor 520 may include a common housing incorporating both a standalone electric motor, one or more sets of windings, and one or more inverter units. Each individual or combined motor and inverter units may include at least one internal cooling provision to maintain the desired and/or required operating temperatures, optionally with the aid of an external cooling circuit, or by air cooling means The electric drive motors 520 may be of any type or design, e.g., radial flux or axial flux design. Both inner-runner and outer-runner designs can be employed for the electric drive motors 520, potentially with some adaptations in the case of an outer-runner motor design.

Each combination of one electric drive motor 520, one or more inverter units, and internal cooling provisions may be defined as one "engine". However, preferably, the minimum element of the "engine" which is physically integrated in the EPU are the electric drive motors 520.

Figure 7A:
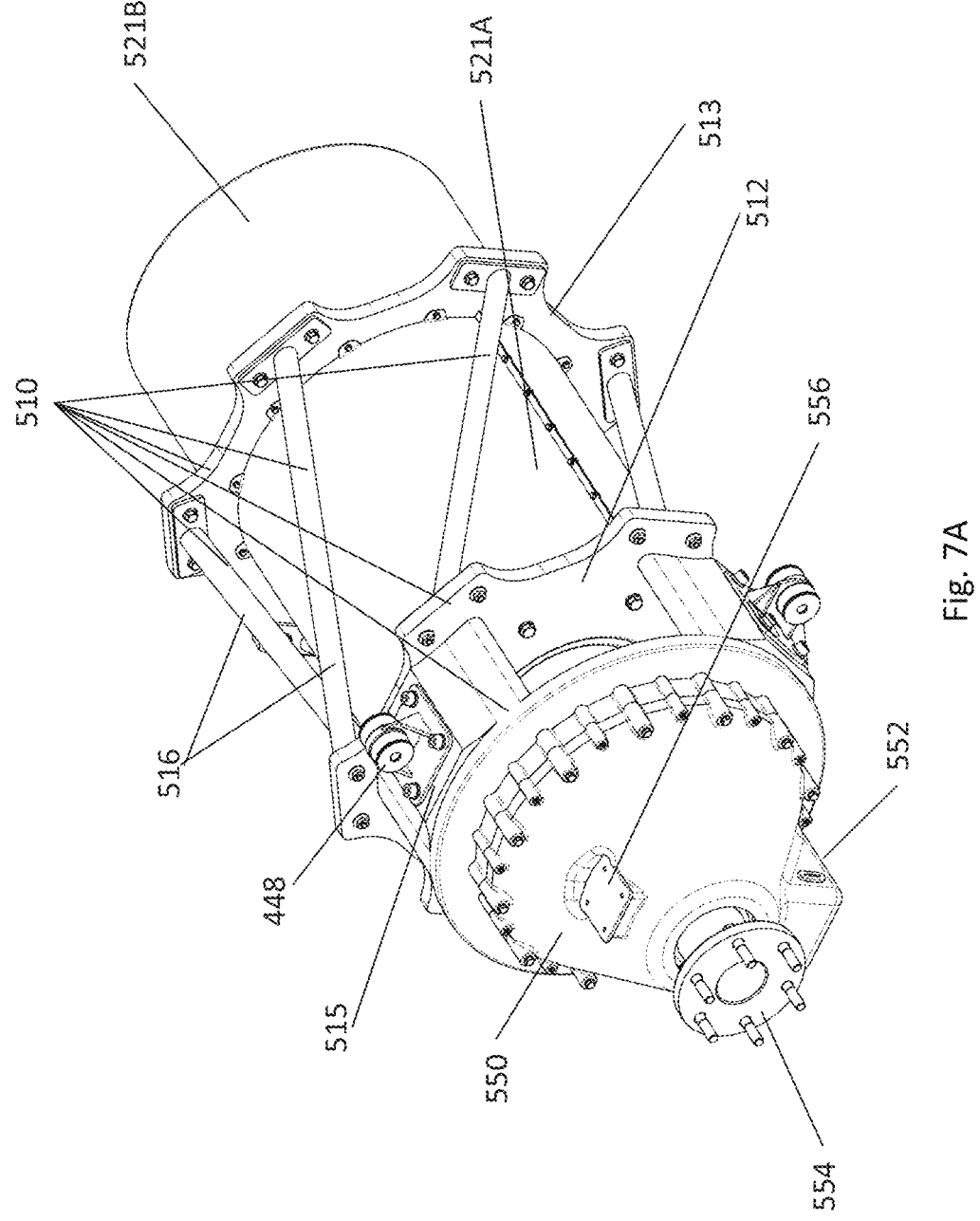
Figure 7B:
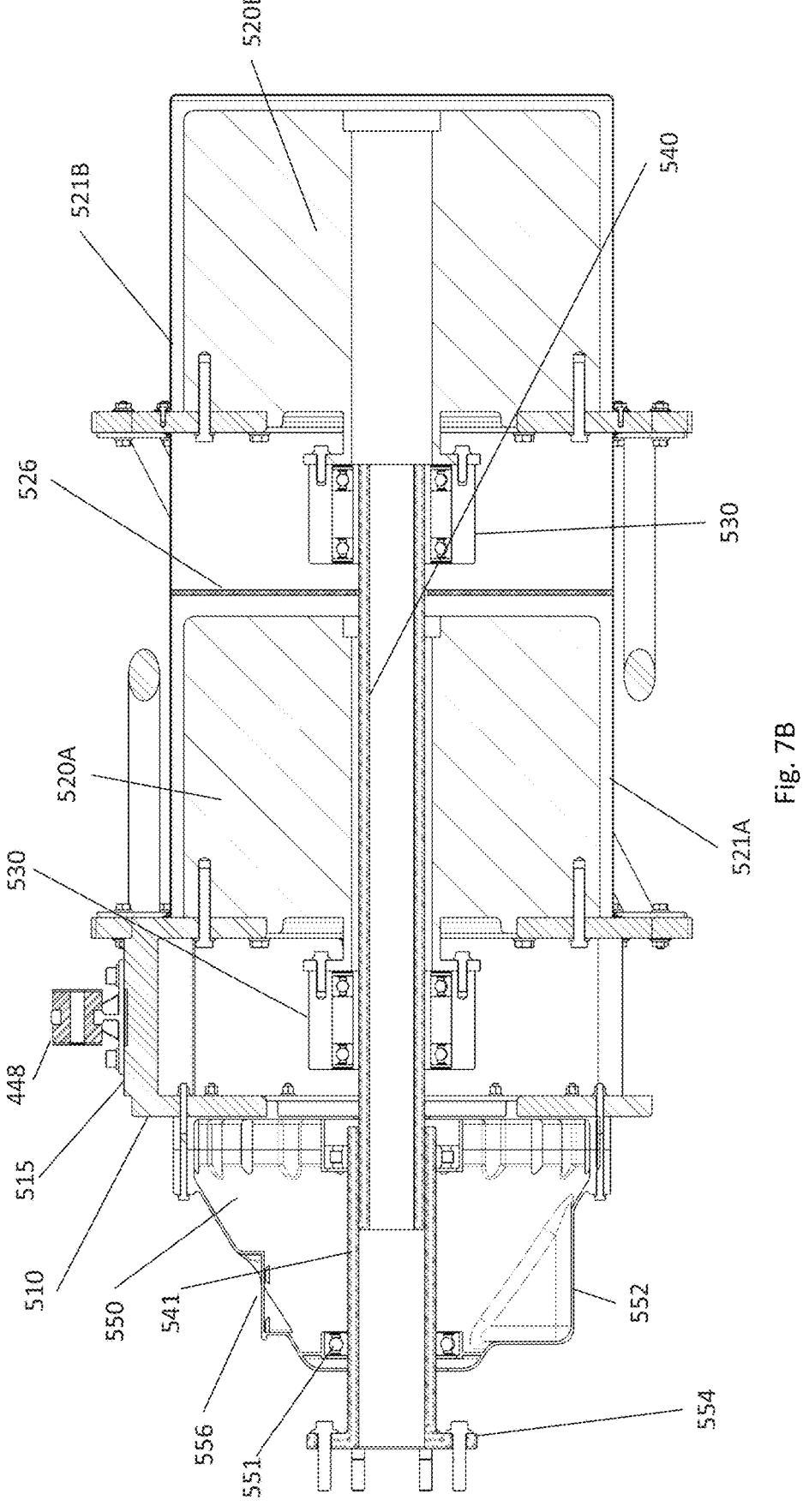

As exemplary shown in FIGS. 5 and 7B, the EPU 500 may further include at least one decoupling device 530 configured to at least partially operatively decouple the first electric drive motor 520A and/or the second electric drive motor 520B from the propeller 402. Preferably, the decoupling device 530 is configured as a clutch, preferably an overrunning clutch. The decoupling device 530 may have an outer race rigidly mounted on a mechanical output shaft of each electric drive motor 520A, 520B.

A plurality of decoupling devices 530 may be provided. Preferably, a decoupling device 530 is provided for and associated with each electric drive motor 520. In other words, in the present example, a decoupling device 530 may be provided for the first electric drive motor 520A and a further decoupling device 530 may be provided for the second electric drive motor 520B. The decoupling device(s) 530 may be at least partially arranged between a rotating part of the respective electric drive motor 520 and a driveshaft (see below for further details) which transmits power from the respective electric drive motor 520 to the propeller 402.

The EPU 500 may include a drive shaft 540 configured to operatively couple the first electric drive motor 520A and the second electric drive motor 520B to the propeller 402. Preferably, the drive shaft 540 is formed as a single piece. In other words, the drive shaft 540 may be a common drive shaft to both or all of the electric drive motors 520A, 520B. The drive shaft 540 may be assembled to a single piece, i.e., a single coherent unit, preferably prior to installing the drive shaft 540 in the EPU 500. Alternatively, the drive shaft 540 may be formed monolithically and/or integrally, i.e., during manufacturing of the drive shaft 540.

The drive shaft 540 may be supported by the inner races of the decoupling devices 530 and, for a fixed pitch propeller system (not shown), a thrust bearing mounted at the front end of the EPU 500. For a propeller system with a PSU, as shown, the PSU 550 may be rigidly attached to a propeller system mounting section 511 (see further below for more details) of the supporting frame 510. The propeller system mounting section 511 may provide mounting means for the PSU or a support structure for a thrust bearing. In case of the provision of a PSU 550, the PSU may provide its own shaft 541, which provides mounting means to the propeller at the front. In that case, the main driveshaft 540, in turn, is connected to the back of the PSU 550 and its PSU shaft 541 in a torque transmitting manner, e.g., via a spline connection. Therefore, the entire shaft assembly may be divided in two parts. This may be beneficial in terms of maintainability, i.e., to allow the main drive shaft 540 to be removed independently from the PSU 550 (i.e., pulled from the back). Otherwise, with one single shaft, it would not be possible to remove the front engine/motor without removing the propeller 402, the PSU 550 and the main shaft 540 first. Naturally, neither the PSU, nor the PSU shaft are required in the case of a constant speed propeller.

Each decoupling devices 530 may have two main functions: the first is to support a part of the weight of the drive shaft 540, and the second is to transmit torque from the output shaft of each electric drive motor 520 in only one direction, while overrunning with negligible drag in the opposite direction. The decoupling devices 530 may ensure that each electric drive motor 520 can only add its torque output contributions in the same direction, but never be driven or add negative torque in the opposite direction. In this way, if one electric drive motor 520 fails by ceasing to provide output power or completely jam its rotor, the only effect at EPU level will be a corresponding loss of power, and never the negative torque which could be caused by back driving a failed electric drive motor 520, thus ensuring motor independency of each electric drive motor 520.

Each decoupling devices 530, e.g., clutch, may be internally integrated or externally attached to each electric drive motor 520. Internally integrating the decoupling device(s) 530 on the motor bores would allow a shorter EPU 500 length, which is beneficial in many aspects. Decoupling devices 530, e.g., clutches, which are externally attached have the benefit of being replaceable on wing without affecting the electric drive motors 520, which presents a maintainability advantage.

For a fixed pitch propeller system (not shown), the (common) drive shaft 540 may be defined as a single, continuous cylindrical part, with an output connection, e.g., a spline or flange, at the front side, followed by a thrust bearing installation which restrains the drive shaft 540 in both axial and radial directions. Further downstream, the drive shaft 540 is radially supported by each inner race of the decoupling devices 530, e.g., clutches, the thrust bearing 551 being the only axial restriction means. This means the decoupling devices 530, e.g., the overrunning clutches, do not restrict the drive shaft 540 in axial direction, allowing for thermal growth without imposing any permanent axial loads on the electric drive motors 520 during operation.

Figure 8:
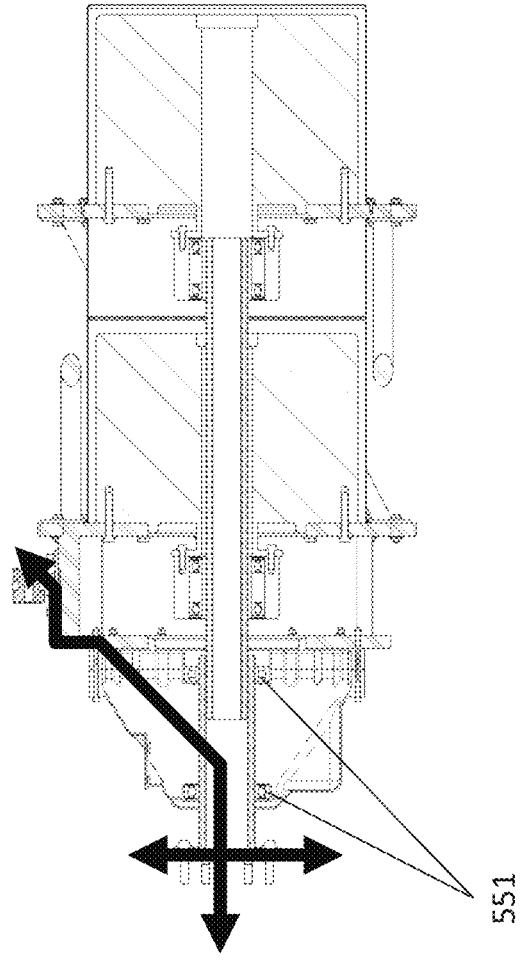
FIG. 8 shows, in a schematic perspective view, a force load path of the electric propulsion unit.

As further shown in FIG. 8, for systems with a PSU 550, the (common) drive shaft 540 is defined as a single, continuous cylindrical part, with a PSU 550 output connection, e.g., a spline or flange, at the front side. The PSU/drive shaft 540 interface is not designed to take on propeller thrust loads, so the drive shaft 540 is axially restrained by typical "light duty" means, such as but not limited to, a snap ring (for a PSU spline interface type) or a flange (in case PSU has an input interface flange—not illustrated). Further downstream, the drive shaft 540 is radially supported by the inner race of each decoupling device 530, e.g., overrunning clutch, a PSU attachment, e.g., a snap ring and/or a flange, being the only axial restriction means. This means the decoupling devices 530, e.g., overrunning clutches, do not restrict the drive shaft 540 in axial direction, allowing for thermal growth without imposing any permanent axial loads on the electric drive motors 520 during operation. Still, the PSU 550 may contain thrust bearing(s) 551.

The PSU 550 may be included to provide auxiliary functions required for a conventional propeller pitch control mechanism. Those functions may include, but not limited to, mounting, and driving provisions for a suitable Propeller Governor Unit (PGU) which may be configured to meter oil pressure to the propeller hub, e.g., to maintain a particular blade pitch, which will ensure the crew commanded propeller speed is maintained, regardless of input torque or aircraft airspeed. Other types of governors, pumps, sensors, or accessories may also be installed in the PSU, as required by the detailed system architecture. Therefore, the PSU houses and manages its own oil system to serve multiple propeller system needs. Such oil system is completely unrelated and segregated to the remainder of the EPU (engines/motors+clutches section).

In addition, the PSU may incorporate reduction gearing between the drive shaft 540 and the propeller output, so the design speeds of the propeller 402 and electric drive motors 520 are decoupled for optimal operation. However, in the example from the figures, a direct drive system is depicted, since the drive shaft 540 is rigidly coupled with the propeller drive shaft 541 from the PSU, i.e., no transmission of torque is realized through gear coupling.

If reduction gearing between the drive shaft 540 and the propeller system 400 is included, the following adaptations may be applicable for each variant: For fixed pitch propeller systems, a PSU unit is added, but instead of propeller auxiliary functions, it may only house the reduction gearing and its standard lubrication system. For constant speed propeller systems, within the PSU 550, the reduction gearing will be incorporated, in addition to the aforementioned propeller auxiliary functions.

The supporting frame 510 may include at least one propeller system mounting section 511 to which the propeller 402 is mountable and at least one aircraft mount 515, preferably a plurality of aircraft mounts 515, configured to attach the supporting frame 510 to the aircraft 100. Preferably, each aircraft mount 515 is axially arranged between the propeller system mounting section 511 and the first mounting section 512 and the second mounting section 513. The propeller system mounting section 511 may be configured as an annular or semi-annular shaped plate.

Preferably, the plurality of aircraft mounts 515 connect the propeller 402 with the first mounting section 512 and/or the second mounting section 513.

The aircraft mount(s) 515 may be configured as shock mount installation pads 515 which may support a shock mount 448 for attaching to the aircraft's airframe. The shock mount 448 provides a relatively soft, shock absorbing, dampening connection between the supporting frame 510 and the airframe mounting struts 210. The shock mount 448 is preferably a standalone removable unit. It may provide a rubber interface between two rigid parts. The shock mount is mounted on the installation pads 515. Each aircraft mount 515 may support one shock mount 448.

A shown in FIG. 8, the EPU 500 may be configured in such a way that the supporting frame 510, together with the PSU external case (if fitted) acts as the main load path for propeller thrust and normal forces which are transmitted to the aircraft mounts 515 without, or only minimally, being transferred to the drive shaft 540 and the first mounting section 512 and second mounting section 513, i.e., to the electric drive motors 520. Without significant axial or radial loads, the drive shaft 540 operates substantially in pure torsion, which may enhance the mechanical reliability and/or the lifetime of the electric drive motors 520 and/or the decoupling device(s) 530, e.g., clutch(es).

Figure 9:
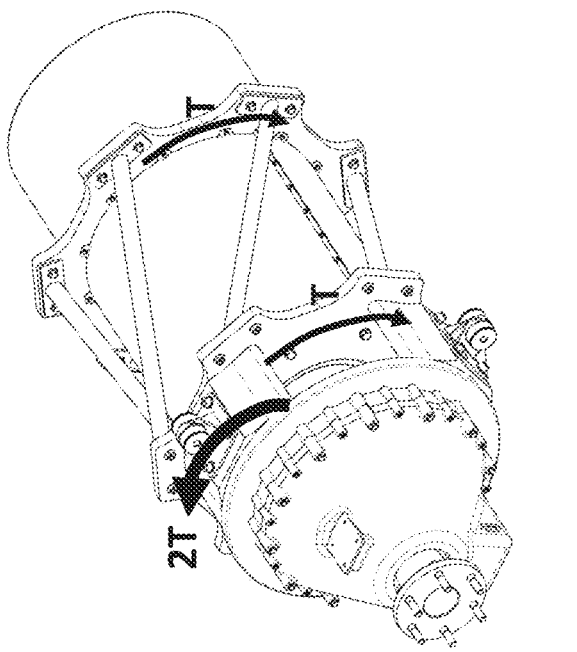
FIG. 9 shows, in a schematic perspective view, a torque load path of the electric propulsion unit.

A shown in FIG. 9, the EPU 500 may be configured in such a way that the supporting frame 510 transfers propeller reaction torque to the airframe of the aircraft 100. FIG. 9 shows a simplified free-body-diagram of the supporting frame 510 for a clockwise (as viewed from the pilot perspective) propeller rotation direction, in which the torque contributions of the individual electric drive motors 520 are added up and combined in the supporting frame structure, which outputs the total torque to the airframe of the aircraft 100. As can be seen, the PSU 500 (if fitted) is not, or only minimally, subjected to any reaction torque at all, due to the construction of the supporting frame 510 and location of the airframe physical interfaces, i.e., the aircraft mounts 515.

As shown in FIGS. 7A and 7B, the EPU 500 may be fitted with additional elements, e.g., one or more separation shields 526 and/or one or more covers 521A, 521B to provide one or more additional functions. In this example, each electric drive motor 520 is physically segregated from the other electric drive motors 520, as well as from the surrounding environment, by means of one or more separation shields 526 and covers 521A, 521B. Those elements may not carry structural loads and are only implemented for physical segregation purposes.

The one or more separation shields 526 and/or covers 521A, 521B may be made of sheet metal and/or firewallgrade materials. The implementation of such separation shields 526 and/or covers 521A, 521B may (additionally) protect the electric drive motors 520, in particular the operational electric drive motor 520 in case of failure of the other electric drive motor 520, against potential overheat, arcing, fire hazards originated from a malfunctioning adjacent electric drive motor 520. Moreover, the implementation of such separation shields 526 and/or covers 521A, 521B may allow or facilitate a collection and safe discharge of potential leaking fluids, e.g., from a faulty bearing compartment and/or decoupling device 530, and/or protection against foreign objects (FOD) from an adjacent environment which could adversely affect the respective electric drive motor 520, e.g., the shaft interface(s). Moreover, the conductive enclosure formed by the separation shields 526 and covers 521A, 521B may protect/isolate all inner elements from lightning currents, and/or electromagnetic interference (EMI) effects, by acting as current path and a faraday cage, in particular if properly electrically bonded to the airframe structure, e.g., via flexible bonding straps or similar means. Thereby, zonal segregation may be provided. Zonal segregation can also provide fire zoning.

Moreover, the multi-engine EPU also accounts for maintainability independence between each engine. Each electric drive motor 520 may be able to be maintained, replaced, tested, serviced or inspected individually on wing, without requiring the complete removal of the EPU 500 from the aircraft, nor the removal of adjacent electric drive motors 520.

This may be realized by the design of the connection members 516, e.g., struts, of the supporting frame 510. Preferably, at least one or at least some of the connection members 516, e.g., at least the connection members 516 on the upper half of the supporting frame 510, is/are removable and re-attachable, e.g., via one or more connection elements, e.g., screw, clips, etc. Additionally, or alternatively, the covers 521A, 521B, e.g., at least the covers 521A, 521B on the upper half of the supporting frame 510, may also be configured to be removable and re-attachable. The covers 521A, 521B may include one or more access devices, e.g., access panels, to allow easy pre-flight inspection of each individual motor compartment, as required by certification regulations.

The propeller 402 may be easily removed as in any conventional General Aviation aircraft. The PSU has a self-contained nature, with a closed oil system, which also allows its independent removal from the rest of the EPU. When the PSU is removed, the drive shaft 540 can be removed by pulling it from the front, since the decoupling devices 530 do not restrict axial shaft movement.

By partially, or entirely removing the drive shaft 540, each electric drive motor 520 and/or decoupling device 530, e.g., clutch, may be individually replaced. This operation also allows inspection and maintenance practices on the drive shaft 540 itself.

Alternatively, depending on general spatial arrangement, the driveshaft 540 may be removed after disconnecting its axial restraint device from the PSU, by axially sliding it backwards through the inner cavity of each electric drive motor hollow shaft, to the necessary extent in order to release each motor to be removed upwards, as previously described. This method may provide a further maintainability advantage, which is the possibility of removing the driveshaft 540, or any electric drive motor 520 without the need for removing the propeller and the PSU.

Therefore, the present invention allows each electric drive motor 520, each decoupling device 530, the drive shaft 540, and PSU (if fitted) are line replaceable units, which can be exchanged without the need of removing the entire powerplant 300 or EPU 500 from the aircraft.

As further apparent from the exemplary visualizations according to, e.g., FIGS. 7A and 7B, the PSU 550 may be provided with an oil tank 552, as discussed herein above, a propeller interface flange 554, for connecting a propeller 402, and/or a propeller accessory drive pad 556.

Figure 10:
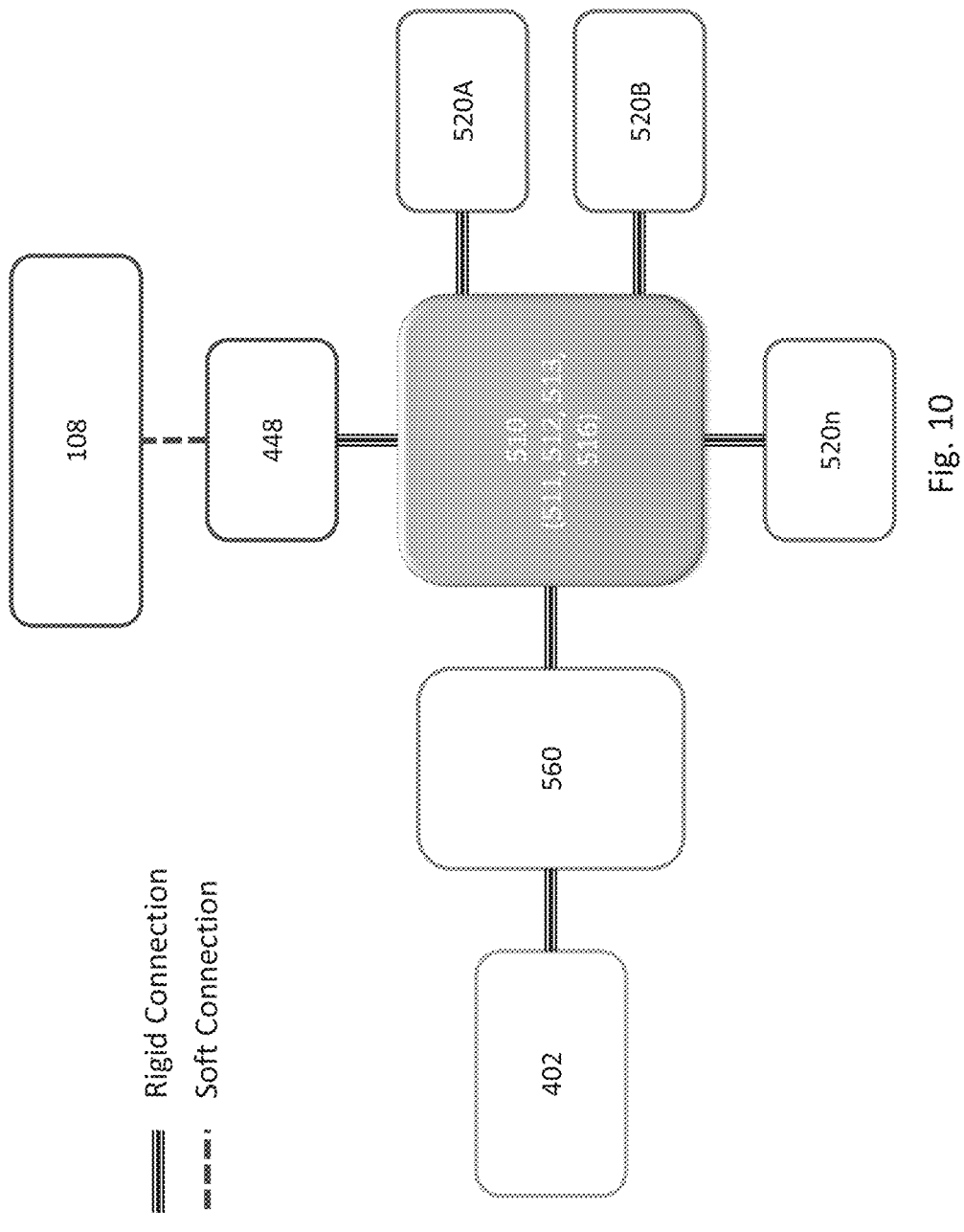
FIG. 10 shows a schematic diagram of the drive device.

FIG. 10 shows a structural schematic diagram of the drive device. As can be seen the cage like support frame 510, including the propeller system mounting section 511, the first and second mounting sections 512, 513 as well as the at least one strut 516 is the central element connecting all the device's components, and each component would not share loads in between them. In particular, the shock mounts 48 are the only components which connect the support frame 510 to the airframe of the aircraft. No other airframe connection points exist. Also, each of the engines/motors (520A, 520B, . . . , 520n) is individually connected to the support frame 510. And so is the propeller 402, possibly via optional auxiliary units 560 such as a gear box, PSU 550 or other functional units.

According to the present disclosure, the propeller system mounting section 511, the aircraft mount 515, strut(s) 516, as well as the first and eventually second mounting section(s) 512, 513 form a single unit, which is mounted together and/or integrally formed, as further discussed hereinabove. This unit is generally stiff and allows individual mounting of the various components, without these influencing one another as regards force and/or torque transmission. At the same time, this whole unit as well as the various components mounted thereto are connected to the aircraft only via the aircraft mount 515, as discussed above. Said connection between the device of the present disclosure and the aircraft may advantageously achieved via shock mounts 448, which allow a dampened suspension of said device on the airframe.

The invention claimed is:

1. A drive device for electrically driving a propeller of an aircraft, the drive device including:
    a first electric drive motor;
    at least one second electric drive motor; and
    a supporting frame which includes a first mounting section to which the first electric drive motor is mounted, at least a second mounting section to which the second electric drive motor is mounted, and at least one strut which interconnects the first mounting section and the second mounting section such that the supporting frame provides a cage-like structure, wherein the first electric drive motor and the second electric drive motor are individually mountable to the supporting frame;
    wherein the first electric drive motor and the second electric drive motor are operatively couplable to the propeller such that the first electric drive motor and the second electric drive motor can simultaneously and/or separately drive the propeller;
    wherein the drive device further includes a drive shaft configured to operatively couple the first electric drive motor and the second electric drive motor to the propeller, the first electric drive motor and the second electric drive motor being arranged in series in a direction along the drive shaft.

2. The drive device according to claim 1, further including at least one decoupling device configured to at least partially operatively decouple at least one of the first electric drive motor and the second electric drive motor from the propeller.

3. The drive device according to claim 2, wherein the decoupling device is configured as a clutch or an overrunning clutch.

4. The drive device according to claim 1, wherein the supporting frame is configured as a single coherent unit to which the first electric drive motor and second electric drive motor are individually mountable.

5. The drive device according to claim 1, wherein the first electric drive motor includes a first electric drive motor housing and the second electric drive motor includes a second electric drive motor housing, wherein first mounting section and the second mounting section are distanced from each other such that the first electric drive motor housing and the second electric drive motor housing are spaced from each other, when the first electric drive motor and the second electric drive motor are mounted to the first mounting section and the second mounting section, respectively.

6. The drive device according to claim 1, wherein the drive shaft is formed as a single piece.

7. The drive device according to claim 1, wherein the first electric drive motor and the second electric drive motor each include a motor shaft configured to be operatively couplable to the drive shaft, wherein at least one of the motor shaft of the first electric drive motor and/or the motor shaft of the second electric drive motor is/are hollow.

8. The drive device according to claim 7, wherein the drive shaft extends at least partly through the hollow drive shaft(s).

9. The drive device according to claim 1, wherein the supporting frame is configured to at least partially encompass at least one of the first electric drive motor and/or the second electric drive motor, when the first electric drive motor and the second electric drive motor are mounted to the supporting frame, respectively.

10. The drive device according to claim 9, wherein the supporting frame is configured to completely encompass at least one of the first electric drive motor and the second electric drive motor, when the first electric drive motor and the second electric drive motor are mounted to the supporting frame, respectively.

11. The drive device according to claim 1, wherein the supporting frame further includes at least one propeller system mounting section to which the propeller is mountable and at least one aircraft mount configured to attach the supporting frame to the aircraft, wherein the aircraft mount is arranged between the propeller system mounting section and the first mounting section and the second mounting section.

12. The drive device according to claim 11, wherein the supporting frame further includes a plurality of the at least one aircraft mount, wherein the plurality of aircraft mounts connect the propeller system with at least one of the first mounting section and the second mounting section.

13. The drive device according to claim 1, wherein at least one of the first mounting section and the second mounting section is/are configured such that at least one of the first electric drive motor and the second electric drive motor extend(s) from the respective mounting section in an axial direction, when the first electric drive motor and the second electric drive motor are mounted to the first mounting section and the second mounting section, respectively, and the drive device is mounted to the aircraft.

14. The drive device according to claim 1, wherein the strut(s) is/are removably connected to at least one of the first mounting section and the second mounting section.

15. An aircraft including the drive device according to claim 1 and at least one propeller which is operatively couplable to the first electric drive motor and the second electric drive motor of the drive device.

16. A supporting frame to which a first electric drive motor and at least one second electric drive motor are individually mountable, wherein the supporting frame includes a first mounting section to which the first electric drive motor is mountable, at least a second mounting section to which the second electric drive motor is mountable, and at least one strut which interconnects the first mounting section and the second mounting section such that the supporting frame provides a cage-like structure, wherein the supporting frame is mountable to an aircraft to mechanically drive a propeller of the aircraft via at least one of the first electric drive motor and the second electric drive motor.

17. A method for installing a drive device electrically driving a propeller of an aircraft into the aircraft, the method including:

(a) mounting a first electric drive motor to a first mounting section of a supporting frame;

(b) mounting at least one second electric drive motor to a second mounting section of the supporting frame;

(c) connecting at least one strut to at least one of the first mounting section and the second mounting section to interconnect the first mounting section and the second mounting section; and (d) mounting the assembled drive device to an airframe of the aircraft, wherein the drive device further includes a drive shaft operatively coupling the first electric drive motor and the second electric drive motor to the propeller, the first electric drive motor and the second electric drive motor being arranged in series in a direction along the drive shaft.

18. The method for installing a drive device according to claim 17, wherein step (c) is performed after step (a) and before step (b), or wherein steps (a) and (b) are performed after steps (c) and (d).

19. The method of claim 14, wherein the drive device is configured according to claim 1.

* * * * *